United States Patent

[11] 3,596,157

| [72] | Inventor | Richard Zechlin |
| --- | --- | --- |
| | | Beloit, Wis. |
| [21] | Appl No | 689,077 |
| [22] | Filed | Dec. 8, 1967 |
| [45] | Patented | July 27, 1971 |
| [73] | Assignee | Fairbanks Morse Inc. |
| | | New York, N.Y. |

[54] OSCILLATOR ENERGIZED MOTOR CONTROL CIRCUIT
3 Claims, 2 Drawing Figs.

[52] U.S. Cl. ............................................. 318/227,
307/252, 318/231
[51] Int. Cl. ............................................. H02p 5/40
[50] Field of Search ............................................. 318/345,
227, 231; 307/252

[56] References Cited
UNITED STATES PATENTS

| 3,154,695 | 10/1964 | MacGregor et al. | 318/227 |
| --- | --- | --- | --- |
| 3,189,810 | 6/1965 | MacGregor | 318/227 |
| 3,281,638 | 10/1966 | Crawford | 321/16 |
| 3,308,340 | 3/1967 | Gille et al. | 323/22 |
| 3,320,506 | 5/1967 | Humphrey | 318/227 |
| 3,346,794 | 10/1967 | Stemmler | 318/227 |
| 3,360,713 | 12/1967 | Howell | 323/22 |
| 3,404,331 | 10/1968 | Winograd | 323/22 |
| 3,202,904 | 8/1965 | Madland | 321/45 |
| 3,434,586 | 3/1969 | Morris | 318/227 |
| 3,436,645 | 4/1969 | Johnson et al. | 318/227 |
| 3,437,911 | 4/1969 | Gutzwiller | 318/227 |
| 3,331,999 | 7/1967 | Dinger | 318/345 |
| 3,332,005 | 7/1967 | Mueller et al. | 318/345 |
| 3,366,861 | 1/1968 | Dudler | 318/345 |
| 3,434,031 | 4/1969 | Wickliff | 307/252 |

Primary Examiner—Oris L. Rader
Assistant Examiner—K. L. Crosson
Attorney—Petherbridge, O'Neill & Lindgren ABSTRACT: An electronic circuit is disclosed for controlling the starting and stopping of a motor. A polyphase source of alternating current is coupled to a plurality of transformers to provide a rectified DC input to an astable oscillator circuit. The output from the oscillator is coupled to a pulse transformer to control the operation of a plurality of pilot SCRs which function to energize a polyphase motor in accordance with the continuous output from the oscillator. The motor may be controlled in an AUTO mode such that a control signal (which may be generated by a suitable photosensor) provides a sufficient emitter bias on the unijunction transistor of the oscillator circuit to selectively terminate the output to the pulse transformer thereby removing the bias on the SCRs and shutting down the motor.

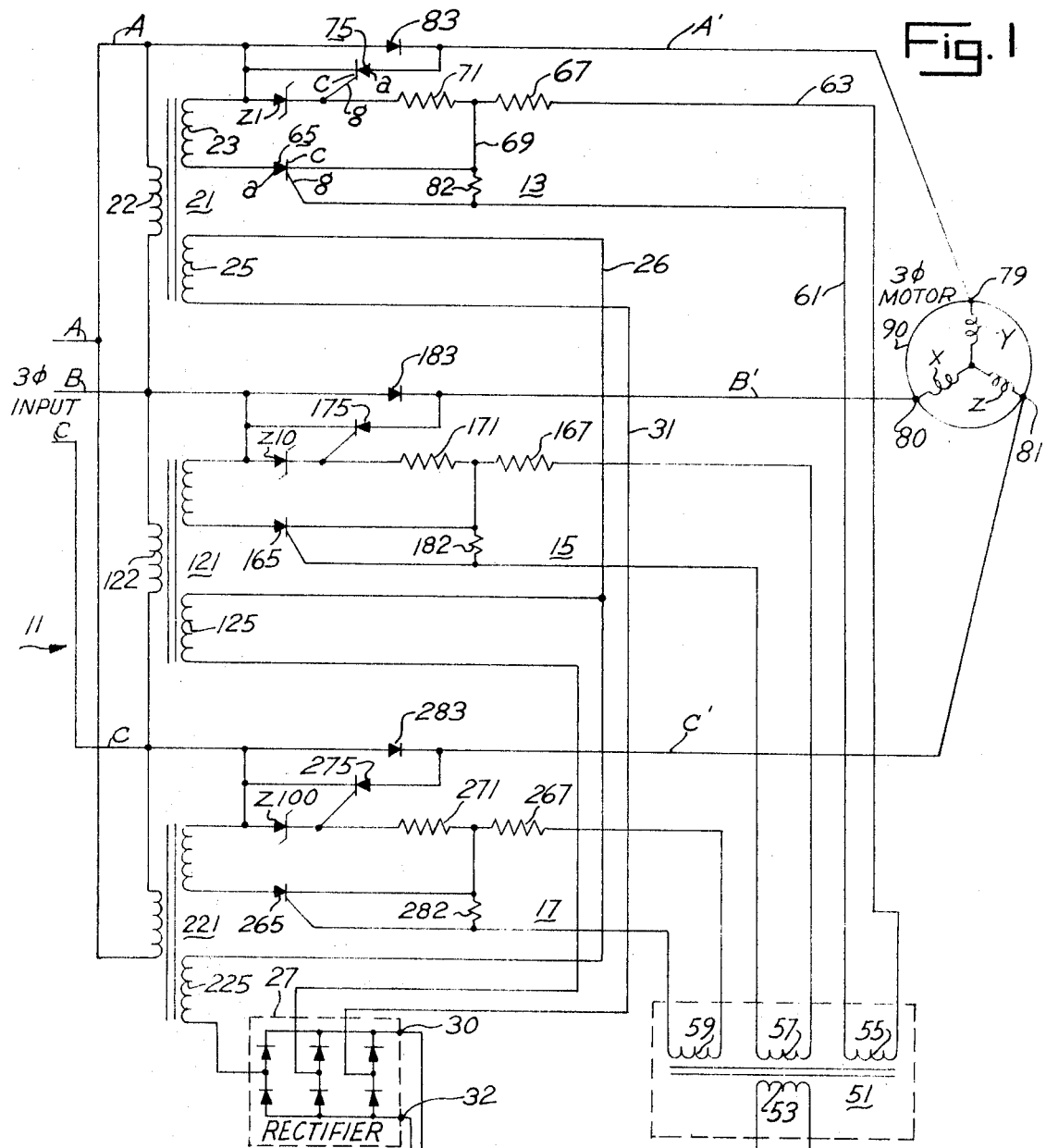
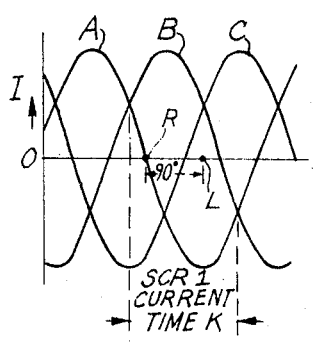
PATENTED JUL 27 1971
3,596,157
Fig. 1
Fig. 2
INVENTOR
RICHARD ZECHLIN
BY
Petherbridge, O'Neill & Nubel
ATTORNEYS

OSCILLATOR ENERGIZED MOTOR CONTROL CIRCUIT

CROSS-REFERENCES TO RELATED APPLICATIONS

Henderson et al. U.S. Pat. Ser. No. 689,395 filed on Dec. 11, 1967 and assigned to the same assignee as the present invention now Pat. No. 3,485,339.

BACKGROUND OF THE INVENTION

1. Field of the Invention

The latest patents known to applicant of the type relating to this invention have been classified under Patent Office classifications Classes 331-113 and 322-16.

2. Description of the Prior Art

The prior art patents known to applicant are:

U.S. Pat. No. 3,226,626 to Moore, U.S. Pat. No. 3,273,076 to Wilting.

In some motor control systems as represented by the known prior art movable contact members have been utilized to energize and deenergize the motors to provide a start-stop type of drive for conveyors, etc.

Also, control systems are utilized wherein various electronic circuitry is employed to controllably energize an associated motor.

SUMMARY OF THE INVENTION

This invention relates to a motor control circuitry and technique for permitting a three-phase alternating current motor to be energized to continuously start and stop. In one embodiment the motor control circuitry of the invention energizes respective motors in accordance with selected signals to drive respective conveyors to position boxes of various lengths carried by the conveyors in selected, spaced relation.

Controls are provided to start-stop the motor in accordance with signals received by photosensitive devices.

It has been found that the circuit in accordance with the invention provides an accurate control with a low-noise level, no contact wear and stable, reliable operation.

BRIEF DESCRIPTION OF THE DRAWINGS

FIG. 1 shows a diagram of the control circuitry according to the invention showing also the three-phase input lines and a motor to be driven.

FIG. 2 shows some waveforms useful in describing the operation of the circuit of FIG. 1.

DESCRIPTION OF THE PREFERRED EMBODIMENT

In FIG. 1 the circuitry 11 for controlling the three-phase motor comprises three similar control circuits 13, 15 and 17 connected to control each of the phases of the three-phase alternating current inputs indicated by the large characters A, B and C referencing the conductors or lead lines. The control circuits 13, 15 and 17 are essentially identical, hence the description of the structure and operation of one circuit 13 likewise applies to the other two circuits 15 and 17.

The control circuit 13 has a transformer 21 including a primary winding 22 connected across lead lines A to B and two secondary windings 23 and 25. The secondary winding 25 is connected in a wye configuration with reference to the corresponding secondary windings 125 and 225 in circuits 15 and 17 to a three-phase full-wave diode rectifier 27. Rectifier 27, which is of a type well known in the art, provides a source of direct current to develop the control pulses for the circuit of FIG. 1, as will now be explained.

The current energy from transformers 21, 121 and 221 is coupled through the respective secondary windings 25, 125 and 225 to rectifier 27. The positive output terminal 30 of rectifier 27 and its output terminal 32 are connected across a series circuit of a resistor 39, a diode 37 and a capacitor 35. The junction of diode 37 and resistor 39 is connected through lead 41 to a terminal 50 also labeled "Control" for purposes to be described. The junction of diode 37 and capacitor 35 is connected to the emitter $e$ of a unijunction transistor 33 of a conventional type. The base $b1$ of transistor 33 is connected through lead 48 to one terminal of a primary winding 53 of a transformer 51; the other terminal of winding 53 is connected through lead 42 to the negative terminal 32 of rectifier 27.

The base $b2$ of unijunction transistor 33 is connected through a resistor 43 and lead 40 to terminal 30 of rectifier 27. Lead 40 also connects through a resistor 45 to the contact labeled ON of a three-position, manually actuatable switch 47. The emitter $e$ is connected to the center common contact of switch 47 and the third contact of switch 46 labeled OFF is connected to lead 42. Transistor 33 and the series circuit including resistor 39, diode 37 and capacitor 35, together with resistor 43 function as a free-running oscillator, as is well known in the art, to provide a pulsed output to transformer 51.

Transformer 51 includes three secondary windings 55, 57 and 59 which are connected to the control portions of each of the circuits 13, 15 and 17 as will be explained. As mentioned above, each of the circuits operate in the same manner and the description of the structure and the operation of circuit 13 is applicable to circuits 15 and 17.

Referring back to circuit 13, the secondary winding 23 of transformer 21 has its upper terminal connected to line A. Note that line A is connected through a diode 83 and line A' to terminal 79 and winding Y of a wye connected three-phase motor 90. The upper terminal of winding 23 is also connected to the anode of a Zener diode Z1, and further connected to the cathode $c$ of a conventional silicon controlled rectifier 75 having a gate $g$, cathode $c$ and anode $a$ electrodes. (Hereinafter each silicon controlled rectifier in the circuit will be referred to as an SCR).

The cathode of Zener diode Z1 is connected to the gate $g$ of SCR 75, and is also connected through series resistors 71, 67, and line 63 to one terminal of secondary winding 55 of transformer 51. The other terminal of winding 55 is connected through lead 61 to the gate $g$ of a second SCR 65 also having gate $g$, cathode $c$ and anode $a$ electrodes. The cathode $c$ of SCR 65 is connected to the junction of resistors 67 and 71 through lead 69 and, the anode $a$ of SCR 65 is connected to the lower terminal of winding 23 of transformer 21.

As will be explained SCR 75 selectively provides a reverse current path around diode 83; and, SCR 65 functions to cause SCR 75 to conduct.

In operation when the alternating current, now shown, is applied to the circuit of FIG. 1 diode rectifiers 83, 183 and 283 in lines A, B and C each tend to block any reverse current flowing therethrough so that the current path to motor 90 is incomplete and motor 90 will not be energized and will be stopped.

The control circuit of FIG. 1 functions to selectively complete the reverse current path in lines A, B and C to permit motor 90 to be energized to run as will now be explained.

In operation and with switch 47 in the automatic position, when the transformer 21 is energized by the source of alternating current, secondary winding 25 couples the AC current to rectifier 27 which provides a rectified direct current output to charge the capacitor 35 of oscillator 34 toward a positive potential. As is known, when capacitor 35 charges to a potential at which the emitter $e$ of unijunction transistor 33 is at a certain percentage of the differential potential between the bases $b2$ and $b1$, the unijunction transistor 33 will fire and provide an output signal at either of bases $b1$ or $b2$. When unijunction transistor 33 fires, capacitor 35 discharges and the unijunction transistor 33 will be turned off. The capacitor 35 will now again start to charge toward a positive potential and the cycle will be repeated.

The output of the oscillator 34 is such that its frequency is many times the frequency of the alternating current coupled to the input lines A, B and C. Accordingly, transformer 51 will provide a multitude of output pulses through its secondary windings 55, 57 and 59 during a single cycle of the alternating current power.

Refer now, for purposes of this explanation, also to FIG. 2 showing the cycles of the alternating current input. The circuit of FIG. 1 is adjusted such that the SCR 65 will be caused to conduct during the period when, for example, the B waveform is positive with respect to the A waveform (as is well known in the art, the other circuits 15 and 17 will have a corresponding conducting relation). More specifically, when the B waveform is positive with respect to the A waveform, the lower terminal of secondary winding 23 will be positive causing the anode $a$ of SCR 65 to have a positive potential applied thereto. Accordingly, a positive pulse from transformer 51 appearing at the gate $g$ of SCR 65 will tend to cause SCR 65 to turn ON or conduct. Current will flow from the lower terminal of winding 23 through a current path from the anode to cathode electrodes of SCR 65, line 69, resistor 71, and the gate $g$ to cathode $c$ of SCR 75.

The time K in FIG. 2 indicates the period of time that gate current can flow in SCR 75. With a balanced three-phase, purely resistive load, it has been found that the anode current in SCR 75 will start to flow at point R in FIG. 2. With a balanced three-phase, purely inductive reactance load, it has been found that the anode current in SCR 75 will start to flow at point L in FIG. 2. (Note that the time K is thus sufficient to handle a purely resistive load as well as a load having purely inductive reactance.) With a typical three-phase motor providing a combination resistive and inductive load to the circuit of FIG. 1, it has been found that the SCR 75 anode current will start to flow (i.e. SCR 75 will start to conduct) at some point between point R and point L in FIG. 2.

When the SCR 75 starts to conduct, a current will be permitted to flow, for example, from the conductor line B, through the diode 183, conductor line B', terminal 80, windings X and Y of motor 90, terminal 79, conductor A' and through SCR 75 to conductor line A. Thus, during the aforesaid period the SCR 75 provides a return current flow path for motor 90, and motor 90 will be energized to run. SCR 75 will continue to conduct until waveform A becomes positive with respect to waveform B.

Similar return current flow paths will continue to be established through SCR 175 and 275 when the proper voltage relation exists between the various phases as long as oscillator 34 continues to provide the turn ON pulses for SCRs 65, 165 and 265 through transformer 51.

When the oscillator 34 stops oscillating, the pulse output from the transformer 51 is cut off. Accordingly, SCRs 65, 165 and 265 will not turn ON, and SCRs 75, 175 and 275 will also not turn ON thereby interrupting the return current flow path, traced above, and the motor 90 will stop.

The oscillator is cut off or prevented from oscillating by applying a signal through control point or terminal 50 to bypass and prevent capacitor 35 from charging toward the positive potential. As long as the signal is applied to control point 50, oscillator 34 will be cut off and motor 90 will be stopped. When the signal at point 50 is removed, capacitor 35 will again be allowed to charge and oscillator 34 will again start oscillating to provide pulses through transformer 51 to cause the SCRs to selectively conduct and enable motor 90 to run.

The switch 47 provides a means for manually controlling the operation of FIG. 1. In the "AUTO" position shown in FIG. 1 the circuit is responsive to the signal at control point 50. When the switch 47 is in its ON position, with the blade contact making contact between its ON and common terminals, the circuit path including resistor 45, switch 47 and the emitter $e$ of transistor 33 will bypass the signal applied from control point 50 to the junction of diode 37 and resistor 39. Accordingly, regardless of the control signal applied through point 50, a high potential from rectifier 27 will be applied through the circuit path just traced to charge capacitor 35, thus the oscillator 34 will continue to oscillate and motor 90 will continue to run regardless of the signal on control point 50.

When the switch 47 is in its OFF position, the emitter $e$ of transistor 33 is effectively connected to the base $b1$ and transistor 33 will not operate.

Resistors 67, 167 and 267 are equalizing resistors and are provided so that the gate drive for the associated SCRs 65, 165 and 265 will have a sufficiently high current to trigger on the said SCRs under various conditions of gate drive, including circuit unbalance conditions.

Resistors 82, 182 and 282 desensitize the gate $g$ to cathode $c$ electrodes of SCRs 65, 165 and 265, so that noise transients do not trigger on these SCRs.

The Zener diodes Z1, Z10 and Z100 are selected such that the breakdown voltage is less than the maximum permissible of gate to cathode voltage of the associated SCRs 75, 175 or 275.

Resistors 71, 171 and 271 limit the gate current for SCRs 75, 175 and 275.

Also, the breakdown voltage of Zener diodes Z1, Z10 and Z100 is higher than the maximum required voltage to trigger on SCR 75, 175 or 275.

While the invention has been particularly shown and described with reference to a preferred embodiment thereof, it will be understood by those skilled in the art that changes in form and details may be made therein without departing from the spirit and scope of the invention.

I claim:

1. Motor control circuitry for controlling the operation of three-phase motor connected to a source of three-phase alternating current, said control circuitry functioning to control the current flow in the current path from said source to said motor and comprising, in combination:
    diode rectifier means connected in the current path for said motor to provide current flow in a first relative direction;
    first and second SCRs each comprising a gate, cathode, and anode electrodes;
    each of said first SCRs being connected across a respective one of said diode means in a relatively reversed direction to permit current flow in a second or return direction;
    the anodes of said first SCRs being conducted to have a potential applied thereto to tend to cause said first SCRs to become conductive when the current through the associated current path is tending to flow in a relatively reverse direction;
    oscillator means connected to selectively provide pulses at a frequency relatively higher than the frequency of said alternating current to each of said second SCRs to bias said second SCRs to tend to conduct;
    means connecting the cathode of each of said second SCRs to the gate of a respective one of said first SCRs;
    whereby when a second SCR is caused to conduct in response to a potential applied to its anode and an oscillator pulse applied to its gate, a current is caused to flow through the respective first SCR to render said respective first SCR conductive and to thereby provide a return current flow path for said motor to enable said motor to operate;
    transformer means having primary windings connected to the three phase alternating current source; and
    three secondary windings each connected to provide a potential of a positive polarity to an associated one of said second SCRs when the current flow in the respective current path tends to be in a relatively reverse direction.

2. Motor control circuitry as in claim 1 wherein the SCRs in a given current path tend to conduct when the three-phase current flowing through a respective current path is relatively negative with respect to the phase current in one of the other current paths.

3. Motor control circuitry as in claim 1 further including a Zener diode connected in the circuit of each of said first SCRs, said Zener diodes having a breakdown potential which is less than the maximum permissible gate to cathode voltage of the associated SCR.

UNITED STATES PATENT OFFICE
CERTIFICATE OF CORRECTION

Patent No. 3,596,157             Dated July 27, 1971

Inventor(s) Richard Zechlin

It is certified that error appears in the above-identified patent and that said Letters Patent are hereby corrected as shown below:

Column 1, line 5, the word "Pat." should be canceled. Column 2, line 11, the number "46" should read -- 47 -- ; line 46, the word "now" should be -- not -- ; line 55, the word "explaine" should read -- explained -- . Column 4, line 54, the word "moto" should be -- motor -- .

Signed and sealed this 10th day of October 1972.

(SEAL)
Attest:

EDWARD M. FLETCHER, JR.          ROBERT GOTTSCHALK
Attesting Officer                 Commissioner of Patents